Dec. 6, 1949  S. J. ELSBY  2,490,623
JET PROPELLER AIRCRAFT ENGINE
Filed Oct. 4, 1944  3 Sheets-Sheet 1

INVENTOR.
SAMUEL J. ELSBY
BY
ATTORNEYS.

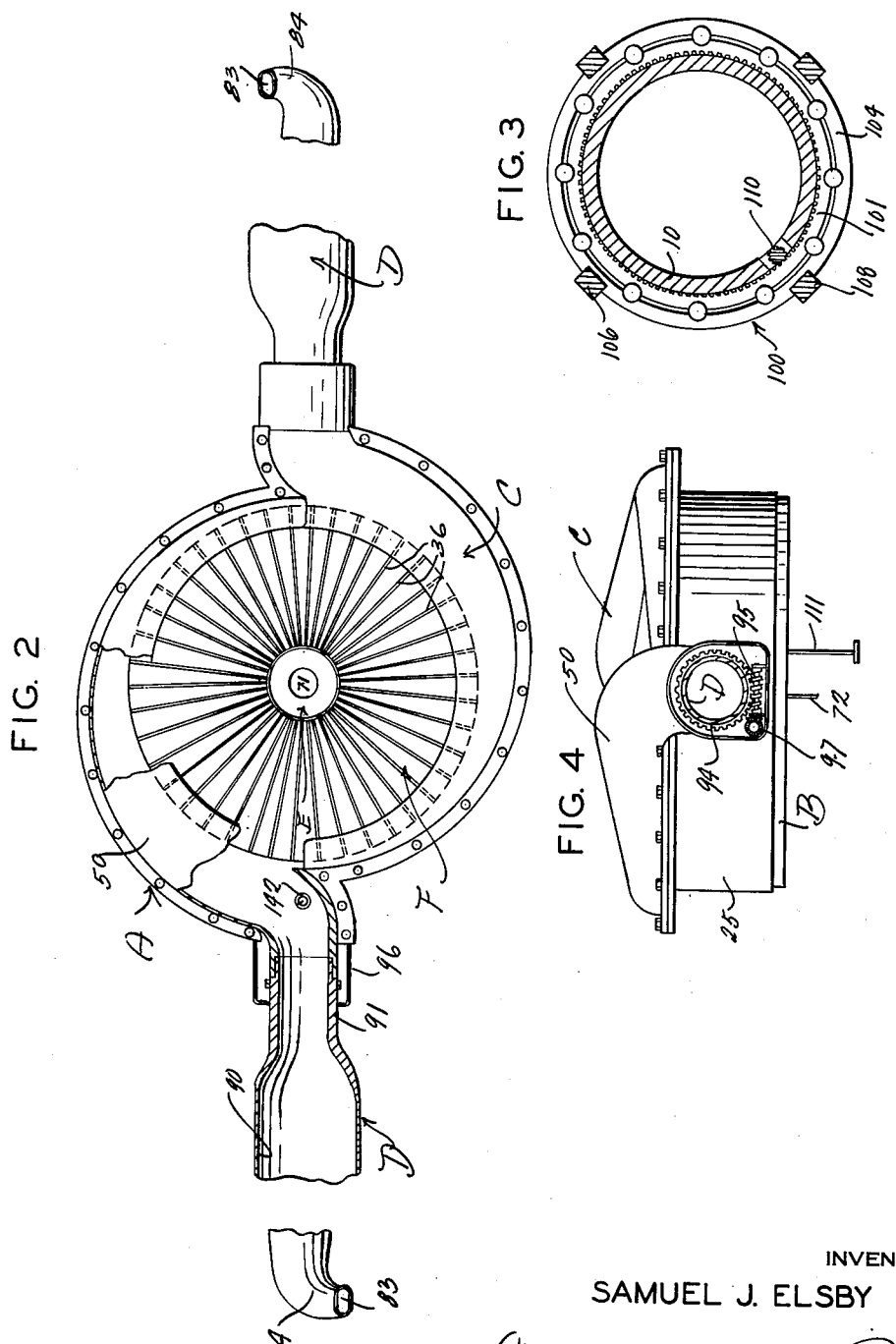

Dec. 6, 1949 S. J. ELSBY 2,490,623
JET PROPELLER AIRCRAFT ENGINE
Filed Oct. 4, 1944 3 Sheets-Sheet 3

INVENTOR.
SAMUEL J. ELSBY
BY *Lancaster, Allwine Rommel*
ATTORNEYS.

Patented Dec. 6, 1949

2,490,623

UNITED STATES PATENT OFFICE 2,490,623

JET PROPELLER AIRCRAFT ENGINE

Samuel J. Elsby, New Albany, Ind.

Application October 4, 1944, Serial No. 557,129

5 Claims. (Cl. 170—135.4)

This invention relates to improvements in jet propeller aircraft engines.

The primary object of this invention is the provision of a self-contained internal combustion engine type rotary propeller structure for aircraft, operating upon the jet principle.

A further object of this invention is the provision of an improved aircraft engine which operates upon the jet principle, and has variable pitch propeller blades.

A further object of this invention is the provision of a jet type propeller device for aircraft in which the speed of the jet propulsion may be maintained constant in relation to the driven device at the highest efficiency.

A further object of this invention is the provision of an air propeller for aircraft, operating upon the jet principle without torque.

Other objects and advantages of the invention will be apparent from the following detailed description.

In the accompanying drawings, forming a part of this specification, and wherein similar reference characters designate corresponding parts thruout the several views—

Figure 2 is a fragmentary front elevation, partly in section, of the improved engine.

Figure 3 is a cross sectional view taken thru the stationary hub structure of the device, substantially on the line 3—3 of Figure 1, and more particularly illustrating certain details of the propeller blade pitch adjusting means.

Figure 4 is a view taken substantially on the line 4—4 of Figure 1, looking endwise of the engine.

Figure 1:
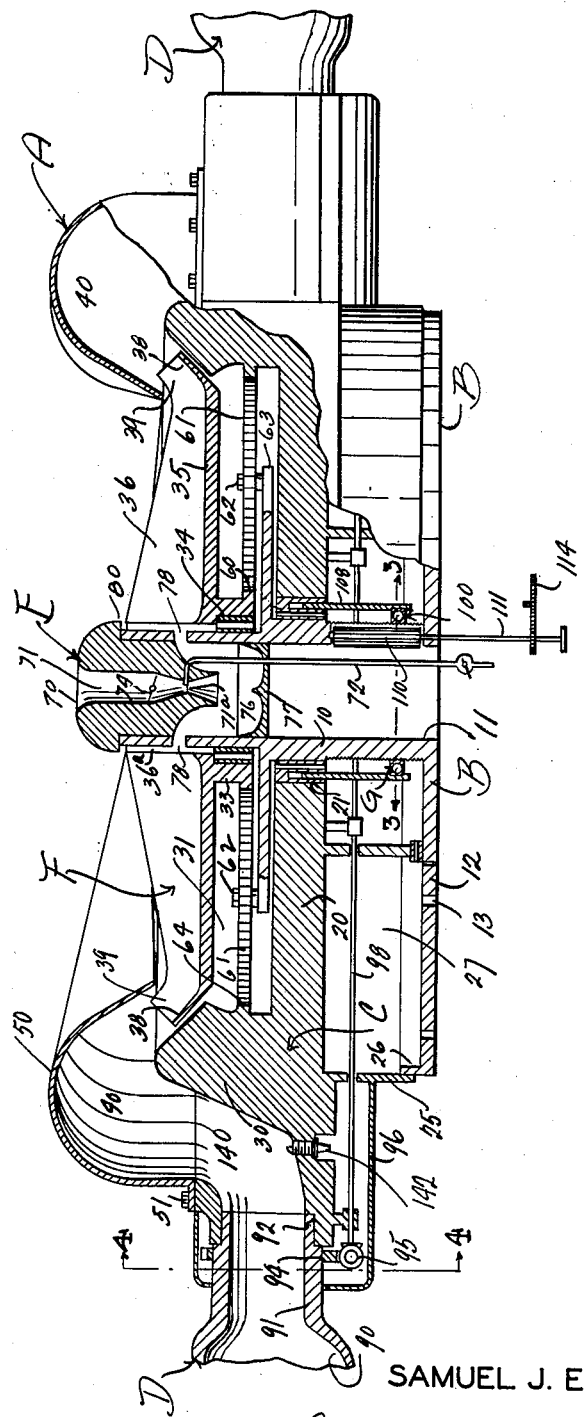
Figure 1 is a fragmentary horizontal sectional view taken thru the improved engine.

In the drawings, wherein for the purpose of illustration is shown only a preferred embodiment of the invention, the letter A may generally designate the improved engine, which includes a stationary supporting frame B; rotary propeller housing C; propellers D; initial stage carburetor E; radial compressor F and blade pitch adjusting means G.

The stationary supporting frame structure B may assume various shapes, since its mode of attachment will be different in connection with different type aircraft. In the main, the same preferably consists of a hollow shaft or hub structure 10 having a passageway 11 therethru. One end of the hub structure 10 is provided with the annular attaching wall 12, normal thereto, having openings 13 for receiving bolts or like attaching expedients.

Figure 6:
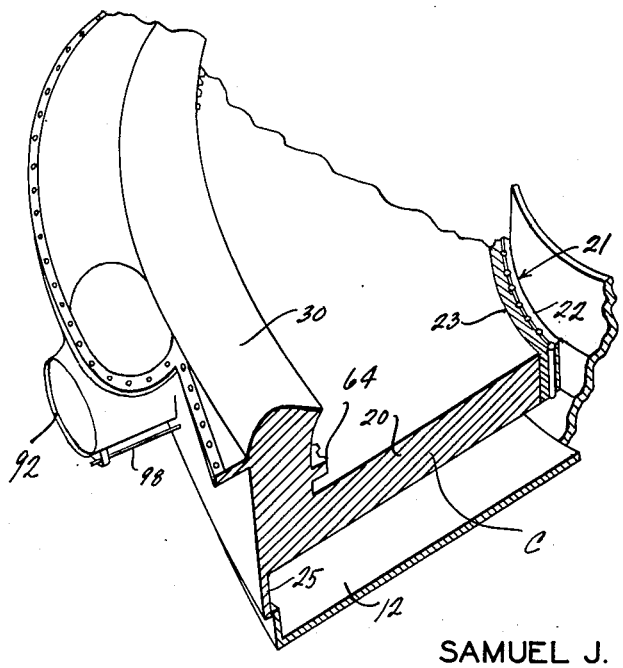
Figure 6 is a fragmentary cross sectional perspective view showing details of the rotary housing.

The rotary housing structure C comprises a main ring-shaped mounting frame 20 rotatably supported by anti-friction bearings generally designated at 21. This may include inner and outer races 22 and 23 respectively with roller or anti-friction members therebetween, as best shown in Figure 6 of the drawings. The inner race is preferably shrunk or otherwise attached upon the hub 10 and the outer race 23 is, of course, secured to the frame 20 of the housing for rotatable support of the latter. The frame 20 may include an annular wall 25, secured to the housing frame 20, as shown in Figure 1, cooperating with the flanged end 26 of the stationary attaching wall 12, and defining a chamber 27 between the frame 20 and the wall 12 wherein are located certain control details of the propeller pitch control to be subsequently described.

For a purpose to be subsequently described, the frame 20 is provided with an annular forward extension 30 defining a pocket 31 wherein is located the radial compressor wheel F. The latter includes a hub 33 rotatably supported upon anti-friction bearings 34, the inner race of which is secured upon the stationary hub or shaft 10 of the supporting frame B. The radial compressor furthermore includes the annular disc 35 upon which radial vanes or blades 36 are mounted in any approved number. These blades are open at their inner ends in spaced relation with the outer surface of the hub 10, the numeral 36ª designating the space between the inner open ends of the blades 36 and the outer surface of the hub 10, as shown in Figure 1. The disc 35 is provided with an outturned annular margin 38 and at this location the blades 36 are also outturned at 39 for the purpose of directing the fuel mixture into the second stage compression chamber 40. The latter is formed by means of a hood 50 secured at 51 to the rotary frame 20 of the housing structure C; this hood in cross section being segmental-shaped and extending in overlapping relation with the outturned ends of the radial compressor blades, as shown in Figure 1.

The hub 33 of the radial compressor is provided with an annular gear designated at 60 in Figure 1 of the drawings driven by means of gears 61 which are rotatably mounted upon pins 62.

The latter are secured upon arms 63 rigid with the hub 10 of the stationary supporting frame B, as shown in Figure 1. These gears 61 mesh with an annular series of gear teeth 64 provided upon the extension 30 of the housing frame 20, within the pocket 31. It is thus apparent that thru the gears 61 rotation of the frame 20 enables the radial compressor wheel to rotate at an appreciably greater speed than the main housing.

It will be noted that the major length of the blades 36 are exposed, except at the outturned ends, for the purpose of admitting air to the radial compressor.

In the passageway 11 of the shaft or hub 10 is located the initial stage carburetor E. This consists of a casing plug or structure 70 in the fore end of the hub 10 having an air inlet passageway 71 therethru constricted at 71ª to provide a Venturi effect, and at the restricted point the fuel is fed thru a line 72 into the passageway 71. A butterfly valve, diagrammatically illustrated at 74, may be placed in the passageway in advance of the fuel inlet. The fuel mixture enters a chamber 76 in the passageway 11; said chamber 76 being formed by a baffle 77 located across the passageway 11; the chamber 76 having ports or outlets 78 into the space 36 of the radial compressor chamber.

It will be noted that an annular lip 80 of the carburetor casing 70 overhangs the end of the space 36ª, slightly, for the purpose of deflecting air for producing a partial vacuum in the back end of the space 36ª and in ports 78, with a tendency to draw the fuel mixture into the radial compressor thru the space between the blades thereof. The fuel mixture enters the space between the blades 36 where it is mixed with air entering the compressor from the front or exposed side of the same for second stage carburetion. As the pressure increases, the mixture flows towards the outer ends of the propeller blades and enters the compression chamber 40.

Referring at this time to the propeller blades D, the same may be conventionally shaped except at their ends and provide an air screw for driving the aircraft. These blades are hollow, having unobstructed passageways 90 therethru. The hub ends 91 rotatably bear at 92 in suitable sockets provided in the rotary housing frame 20 therefor, and if desired, anti-friction bearings may be located at the mounting sockets 92. The hubs are rotatable on their axes so that the pitch of the blades D may be varied, by the means G to be subsequently described. At their ends the blades are each provided with a jet orifice 83 opening laterally of the blades, each blade being outturned at 84 to form the orifice.

Figure 5:
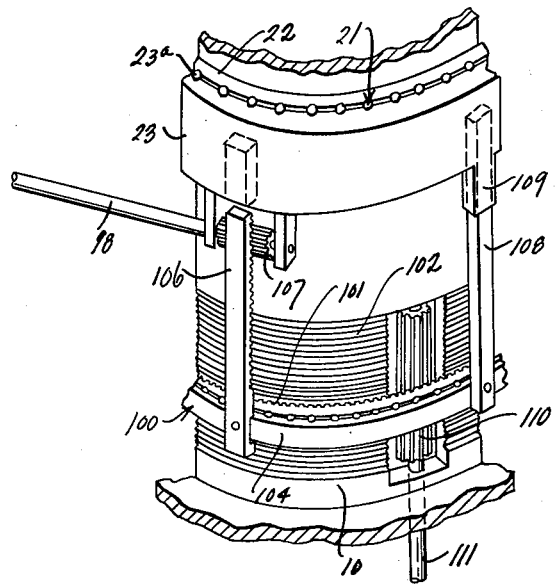
Figure 5 is a fragmentary perspective view showing certain mounting details of the rotary housing and more particularly showing details of the propeller blade pitch adjusting means.

Referring to the blade pitch adjusting means G, each hub 91 is provided with a worm wheel 94 meshing with a worm 95, as shown in Figures 1 and 4 of the drawings. The latter may be mounted in a housing extension 96. The worm 95 may be driven by bevel gears 97, one of which is keyed with a shaft 98 leading radially to the stationary hub 10 in a rather tangential relation therewith, as shown in Figure 5. Each blade D is provided with this structure, altho it is shown for only one of the blades, in the drawings.

The means for rotating the shaft 98 preferably consists of a ring-shaped nut and bearing structure 100 which includes an inner race 101 internally screw threaded for adjustment on external screw threads 102 provided upon the hub 10, as shown in Figures 1 and 5 of the drawings. The outer race 104 is provided with a rack 106 secured therewith and extending parallel with the hub 10; the teeth thereof meshing with a gear 107 keyed on the shaft 98. The outer race may also be provided with guide arms 108 socketed in sliding relation within extensions 109 mounted upon the outer race 23 of the bearing structure 21 above referred to.

The means for rotating the inner race of the bearing 100 preferably consists of a gear 110 rotatably mounted by a shaft 111 on the stationary supporting frame B, as shown in Figures 1 and 5 of the drawings. The teeth of this gear 110 mesh with internal teeth provided upon the inner surface of the race 101; the latter thus being double threaded for cooperation with the gear 110 and on the threads 102. Any suitable mechanism may operate the shaft 111 and it is quite obvious that rotation of the same will feed the gear 100 along the hub 10. This movement will rotate the shaft 98 and vary the pitch of the propellers D, as is quite obvious. If desired, a geared indicator 114 may be associated with the shaft 111.

The outturned margin of the radial compressor, particularly the blade tips thereof, are covered by the top part of the main housing hood 50. This arrangement is advantageous in creating the proper Venturi effect in the housing before the mixture reaches the firing chamber 140. The firing of the charge in the chamber may be effected by means of spark plugs 142, which may be suitably brush controlled or otherwise operated, as will be readily understood by anyone skilled in the art to which this invention relates. The cycle of carburetion and compression has been above detailed. As the pressure increases in the compression chamber 40, the mixture flows into the firing chamber where it is ignited by the spark plug 142. Once firing has started, the process is continuous. The propeller blades D are initially set at zero pitch and they are rotated together with the housing C by any external means, in a direction opposite to the propeller tips. This, of course, will initially move the compressor, drawing in the fuel mixture from the carburetor etc. Once firing has started, the process is continuous and the propeller blades and main housing will continue to rotate due to repulsion of the propeller tip jets. Pressure will always be less at the propeller tip jets due to Venturi action of firing and compression chambers, as well as the ratio of propeller tip jet openings to compressor opening. Axial power from the device will be developed when the pitch of the propeller blades is changed from zero thru the pitch changing means. The device complies with the principle of jet propulsion in that there are no closed surfaces to re-act against. To that end the ratio of openings, both inlet and jet orifice openings are in proper ratio.

Various changes in the shape, size and arrangement of parts may be made to the form of invention herein shown and described, without departing from the spirit of the invention or the scope of the following claims.

I claim:

1. In a jet type aircraft engine the combination of a hub structure, a rotary housing rotatably mounted upon the hub structure, propeller blades carried by the rotary housing having jet openings therein, fuel charge mixing means mounted upon the hub structure including a rotatable charge compression and mixing wheel, means for rotating said wheel, said housing being constructed and arranged to permit air to directly enter said wheel for mixing with the fuel charge, a firing chamber in said housing open to the jet openings, and means providing a compression stage into which the fuel charge enters from said wheel and thence into said firing chamber.

2. In a jet propelled aircraft engine the combination of a stationary hub structure, a rotary housing rotatably mounted upon the hub structure, jet type blades carried by the rotary housing, a fuel charge mixing and compressing vaned wheel mounted rotatably upon said hub structure, means for driving said wheel, means for supplying a fuel charge directly to the vanes of said wheel, and firing chamber means in the housing for receiving the fuel charge and transmitting it to the jet openings of said blades.

3. In a jet propelled aircraft engine the combination of a hub structure, a rotary housing upon the hub structure, jet type blades mounted upon the hub structure having jet orifices therein, a wheel rotatably mounted upon said hub structure, the housing having an air inlet opening to said wheel and the wheel having vanes, means gearing the wheel to the rotary housing for driving the wheel from said housing at a greater speed of rotation than the housing, means for supplying fuel directly to said wheel where it is admixed with the air entering the wheel, and means in the housing including a firing chamber for receiving a fuel charge from the wheel and directing the products of combustion to said blades and jet orifices therein.

4. In a jet propelled aircraft engine the combination of a stationary hub structure, a rotary housing and propeller structure mounted upon the hub structure, said rotary housing and propeller structure having a firing chamber therein including means for firing a fuel charge, means in the hub structure for initially mixing air and fuel to provide a fuel charge, a vaned radial compressor rotatably mounted upon the hub structure, said rotary housing being open to permit additional air to enter said radial compressor, and means formed by the rotary housing and periphery of the radial compressor for directing a fuel charge with a compressed Venturi effect into the firing chamber.

5. In a jet propelled aircraft engine the combination of a stationary hub structure having a fuel charge compartment therein open forwardly for receiving air, means for feeding fuel into said hub to admix with said air, a rotary annular housing carried by said hub structure, a rotary air and charge compressor rotatably mounted upon the hub structure, said housing being open to admit air to the rotary compressor, means formed in the hub structure to pass the fuel charge mixed in the hub structure into said rotary compressor for receiving additional air therefrom, said rotary compressor and housing being constructed and arranged to direct the compressed fuel charge peripherally upon said rotary compressor, means formed peripherally in the housing about the rotary compressor for receiving the fuel charge from the compressor and effecting a second stage compression, said housing having a firing compartment therein into which the fuel charge is directed from the second stage compression, and blades mounted upon said housing for receiving the products of combustion from the firing chamber and having jet orifices therein.

SAMUEL J. ELSBY.

REFERENCES CITED

The following references are of record in the file of this patent:

UNITED STATES PATENTS

| Number | Name | Date |
|---|---|---|
| 1,099,083 | Duc | June 2, 1914 |
| 1,519,444 | Fales | Dec. 16, 1924 |
| 1,569,607 | Beck | Jan. 12, 1926 |
| 1,668,971 | McCauley | May 8, 1928 |
| 1,897,817 | Paquit | Feb. 14, 1933 |
| 1,942,100 | Houston | Jan. 2, 1934 |
| 2,011,061 | Loescher | Aug. 13, 1935 |
| 2,296,987 | Emmons | Sept. 29, 1942 |
| 2,371,687 | Gerhardt | Mar. 20, 1945 |
| 2,397,357 | Kundig | Mar. 26, 1946 |

FOREIGN PATENTS

| Number | Country | Date |
|---|---|---|
| 227,151 | Great Britain | Jan. 12, 1925 |
| 366,450 | Great Britain | July 30, 1930 |